(12) United States Patent
Shoji et al.

(10) Patent No.: US 7,659,503 B2
(45) Date of Patent: Feb. 9, 2010

(54) IMAGE SENSOR MODULE AND LIGHT GUIDING MEMBER USED FOR THE SAME

(75) Inventors: Motoari Shoji, Kyoto (JP); Yasuhiro Nagao, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 12/221,084

(22) Filed: Jul. 31, 2008

(65) Prior Publication Data
US 2009/0057541 A1    Mar. 5, 2009

(30) Foreign Application Priority Data
Aug. 2, 2007   (JP)   ............... 2007-201831
Aug. 2, 2007   (JP)   ............... 2007-201832

(51) Int. Cl.
*H01J 5/16*   (2006.01)
(52) U.S. Cl. ................................. 250/227.11; 250/239
(58) Field of Classification Search ............ 250/227.11, 250/227.25, 227.29, 341.2, 577, 902, 903; 340/619; 73/293; 356/136
See application file for complete search history.

(56) References Cited
U.S. PATENT DOCUMENTS 4,320,291 A  *  3/1982  Uramoto ................ 250/227.11
6,121,755 A  *  9/2000  Nowak et al. ............... 320/132
6,448,573 B1 *  9/2002  Benton ........................ 250/577
6,538,727 B2 *  3/2003  Nicholas .................... 356/136
6,555,837 B2 *  4/2003  Benton ........................ 250/577
6,911,803 B2 *  6/2005  Hanson ....................... 320/132

FOREIGN PATENT DOCUMENTS
JP         2000-125080         4/2000

* cited by examiner

*Primary Examiner*—Seung C Sohn
(74) *Attorney, Agent, or Firm*—Hamre, Schumann, Mueller & Larson, P.C.

(57) ABSTRACT

An image sensor module includes a light source, a light guide elongated in a first direction, a reflector covering the guide, and a light receiver for linear light reflected on a reading target in a second direction perpendicular to the first direction. The guide includes an incident surface for entering light from the light source, a reflecting portion for reflecting, in a direction crossing the first direction, the light from the incident surface, and a surface for emitting light from the reflecting portion as linear light elongated in the first direction. The reflector has an opening and an inclined surface. The opening extends in the first direction to pass the light reflected by the target. The inclined surface, at an end of the opening in the first direction, has a normal which is non-parallel to the first direction and a third direction perpendicular to the first and second directions.

7 Claims, 8 Drawing Sheets

IMAGE SENSOR MODULE AND LIGHT GUIDING MEMBER USED FOR THE SAME

BACKGROUND OF THE INVENTION

1. Field of the Invention

The present invention relates to an image sensor module used for an image reader. The present invention further relates to a light guiding member used for such an image sensor module.

2. Description of the Related Art

Conventionally, image readers are known such as a document scanner for reading an image printed on a document or a bill reader for discriminating between real bills and counterfeit bills. As a unit for constituting such an image reader, an image sensor module having the function to illuminate the object to be read with linear light and the function to read the reflected light is widely used.

FIG. 11 is a sectional view showing the structure of a conventional image sensor module X (see JP-A-2000-125080). The image sensor module X includes a case 91 elongated in a direction perpendicular to the sheet surface of FIG. 11. A reflector 92, a light guiding member 93, a lens unit 94, a substrate 95, an optical sensor 96 and an LED module (light source) are accommodated in the case 91. The light guiding member 93 and the optical sensor 96 extend in the longitudinal direction of the case 91.

The light emitted from the LED module travels in the light guiding member 93 in the longitudinal direction. The light guiding member 93 includes a reflecting portion 93a and a light emitting surface 93b. The light traveling in the light guiding member 93 is reflected by the reflecting portion 93a toward the light emitting surface 93b, so that linear light extending in the longitudinal direction is emitted from the light emitting surface 93b. The linear light is reflected by the object P to be read, and the reflected light is converged by the lens unit 94 onto the optical sensor 96. The optical sensor 96 outputs the image data corresponding to the received amount of light.

The conventional image sensor module X still has room for improvement in the following points. That is, in the image sensor module X, the reading accuracy of data is relatively low at portions adjacent to the ends in the longitudinal direction. One of the reasons for this is that the luminance distribution of the linear light emitted from the light guiding member 93 is not necessarily uniform. Specifically, although the luminance of the linear light from the light guiding member 93 is relatively uniform at portions adjacent to the center, the luminance decreases as progressing toward the ends.

As another reason for the relatively low reading accuracy of data, the luminance of the linear light reflected by the object P changes locally before the light reaches the optical sensor 96. For instance, it is now assumed that linear light with uniform luminance distribution is directed to an object P the entire surface of which is uniformly white. Ideally, in this case, the luminance of the reflected light to reach the optical sensor 96 should be uniform along the longitudinal direction of the sensor. In the conventional image sensor module X, however, the luminance of the reflected light tends to become non-uniform in the stage of entering the lens unit 94.

SUMMARY OF THE INVENTION

The present invention has been proposed under the circumstances described above. It is, therefore, an object of the present invention to provide an image sensor module which is capable of emitting linear light having uniform luminance distribution and properly reading the content of an object to be read. An other object of the present invention is to provide a light guiding member used for such an image sensor module.

According to a first aspect of the present invention, there is provided an image sensor module comprising a light source, a light guiding member, a reflector and a light receiving element. The light guiding member is elongated in a first direction and includes a light incident surface from which light emitted from the light source enters, an inclined surface for reflecting, in the first direction, the light having entered from the light incident surface, a reflecting portion for reflecting, in a direction crossing the first direction, the light traveling in the first direction, and a light emitting surface for emitting the light from the reflecting portion as linear light elongated in the first direction. The reflector covers at least part of the light guiding member. The light receiving element receives linear light reflected by an object to be read in a second direction which is perpendicular to the first direction. The light incident surface of the light guiding member is oriented in the second direction. The inclined surface overlaps the light incident surface as viewed in the second direction, and the light emitting surface partially overlaps the inclined surface in the first direction. The reflector is formed with an opening and an inclined surface. The opening is elongated in the first direction to allow the light reflected by the object to pass therethrough. The inclined surface of the reflector is positioned at an end of the opening in the first direction. Further, the inclined surface of the reflector has a normal which is neither parallel to the first direction nor parallel to a third direction which is perpendicular to both of the first direction and the second direction.

According to a second aspect of the present invention, there is provided an image sensor module comprising a light source, a light guiding member, a reflector and a light receiving element. The light guiding member is elongated in a first direction and includes a light incident surface from which light emitted from the light source enters, a reflecting portion for reflecting, in a direction crossing the first direction, the light traveling from the light incident surface, and a light emitting surface for emitting the light from the reflecting portion as linear light elongated in the first direction. The reflector covers at least part of the light guiding member. The light receiving element receives linear light reflected by an object to be read in a second direction which is perpendicular to the first direction. The reflector is formed with an opening and an inclined surface. The opening is elongated in the first direction to allow the light reflected by the object to pass therethrough. The inclined surface is positioned at an end of the opening in the first direction. Further, the inclined surface has a normal which is neither parallel to the first direction nor parallel to a third direction which is perpendicular to both of the first direction and the second direction.

Preferably, the image sensor module of the present invention further comprises a lens unit for converging linear light passed through the opening onto the light receiving element. The inclined surface of the reflector overlaps the lens unit in the third direction.

Preferably, the reflector is formed with an extension elongated from an edge of the inclined surface in the first direction. The extension is located farther from the light guiding member in the third direction than the inclined surface of the reflector is.

According to a third aspect of the present invention, there is provided a light guiding member elongated in a first direction. The light guiding member includes a light incident surface, an inclined surface for reflecting, in the first direction, the light having entered from the light incident surface, a reflecting portion for reflecting, in a direction crossing the first direction, the light reflected by the inclined surface, and a light emitting surface for emitting the light from the reflecting portion as linear light elongated in the first direction. The light incident surface is oriented in a second direction which is perpendicular to the first direction. The inclined surface overlaps the light incident surface as viewed in the second direction. The light emitting surface partially overlaps the inclined surface in the first direction.

Preferably, the reflecting portion does not overlap the inclined surface in the first direction.

Preferably, the light emitting surface does not overlap the inclined surface as viewed in the first direction.

Other features and advantages of the present invention will become more apparent from the detailed description given below with reference to the accompanying drawings.

DETAILED DESCRIPTION OF THE PREFERRED EMBODIMENTS

Preferred embodiments of the present invention will be described below with reference to the accompanying drawings.

Figure 6:
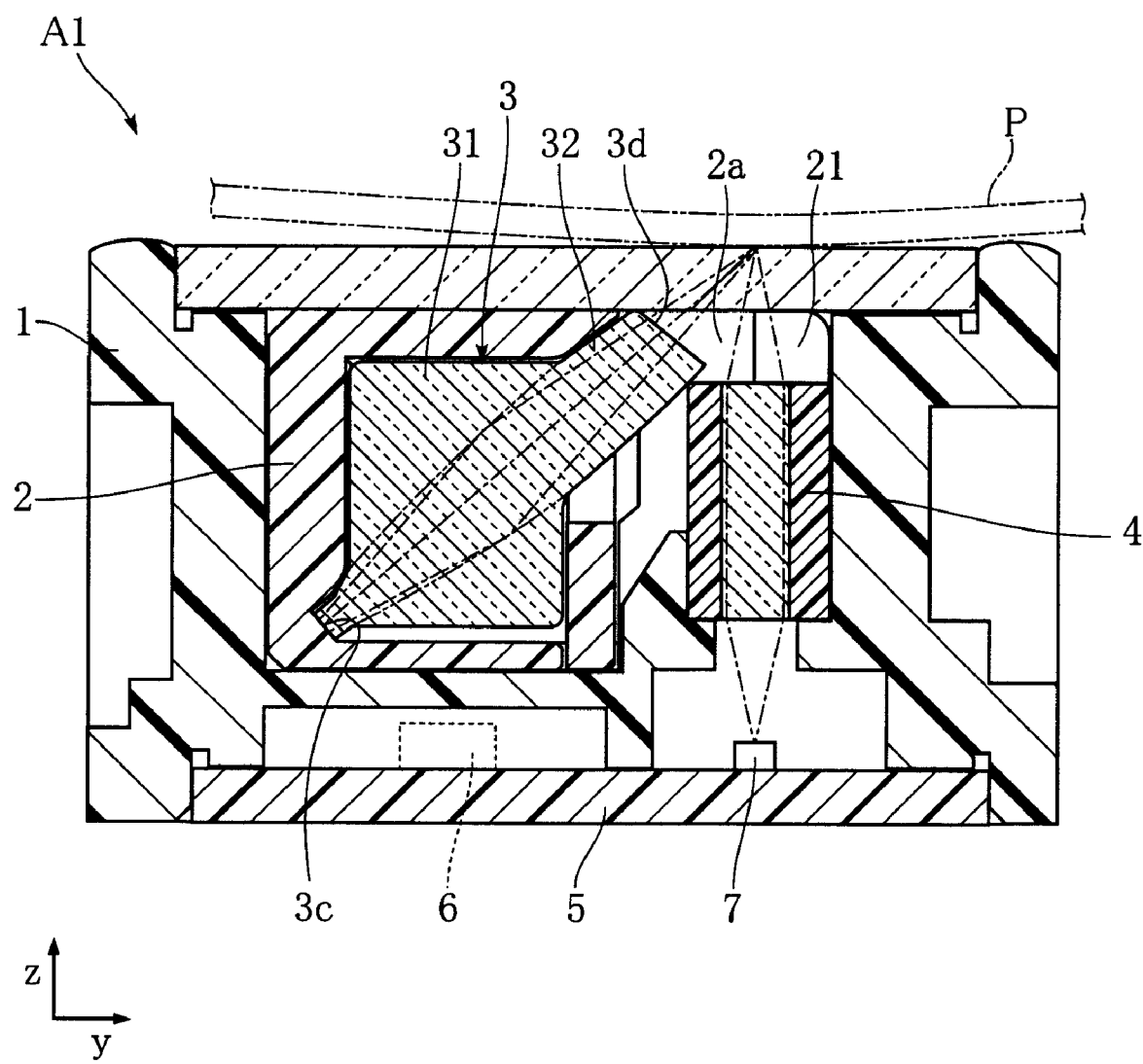
FIG. 6 is a sectional view taken along lines VI-VI in FIG. 2.
Figure 7:
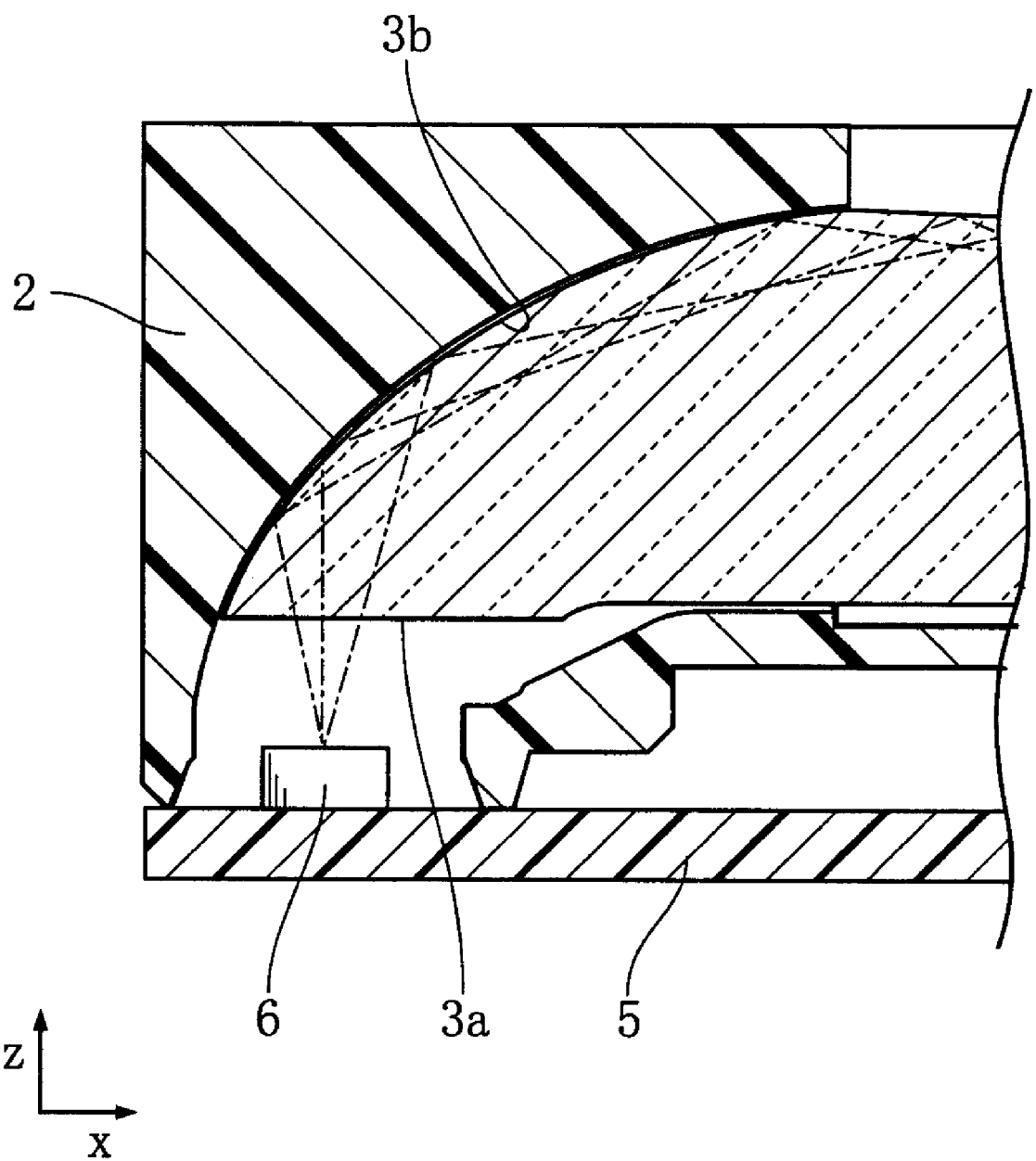
FIG. 7 is a sectional view taken along lines VII-VII in FIG. 2.

FIGS. 1-7 show an image sensor module according to a first embodiment of the present invention. The illustrated image sensor module A1 includes a case 1, a reflector 2, a light guiding member 3, a lens unit 4, a substrate 5, an LED module 6, an optical sensor 7 and metal parts 8. The image sensor module A1 has an image reading width of about 100 mm and may be suitably used as one of the parts for constituting a bill reader, for example. For easier understanding, only the reflector 2, the light guiding member 3, the substrate 5 and the LED module 6 are illustrated in FIG. 7.

The case 1 accommodates the reflector 2, the light guiding member 3, the lens unit 4, the substrate 5, the LED module 6 and the optical sensor 7 and is in the form of a generally rectangular parallelepiped elongated in the direction x. The case 1 is made of e.g. black resin.

Figure 1:
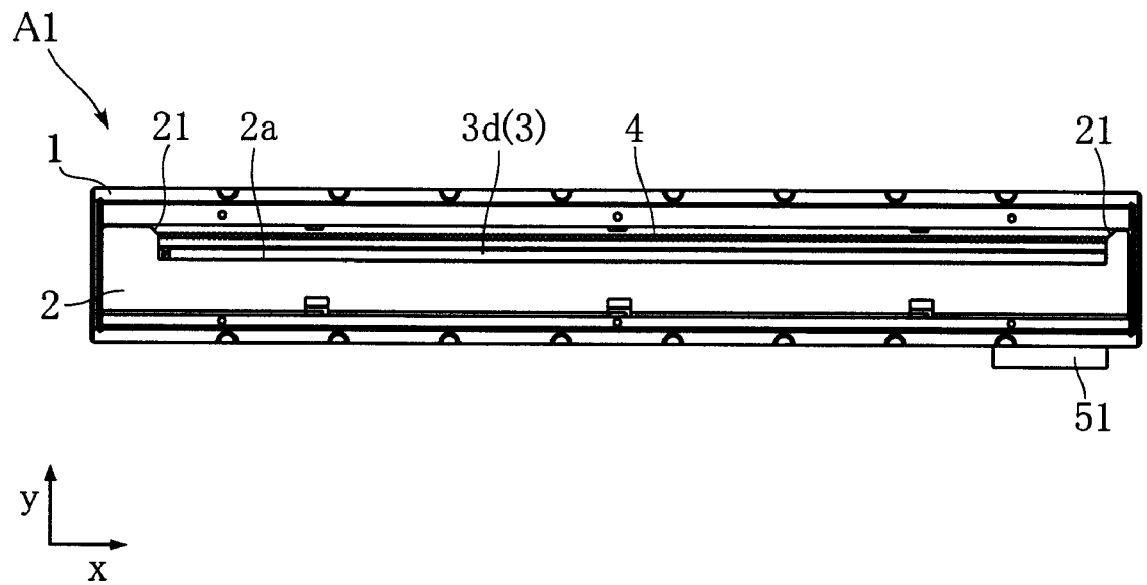
FIG. 1 is a plan view showing an image sensor module according to a first embodiment of the present invention.

The reflector 2 serves to prevent the light traveling in the light guiding member 3 from unduly leaking to the outside and is made of e.g. white resin. As shown in FIG. 1, the reflector 2 is elongated in the direction x. As shown in FIG. 6, the reflector 2 accommodates the light guiding member 3 in such a manner as to surround it.

Figure 2:
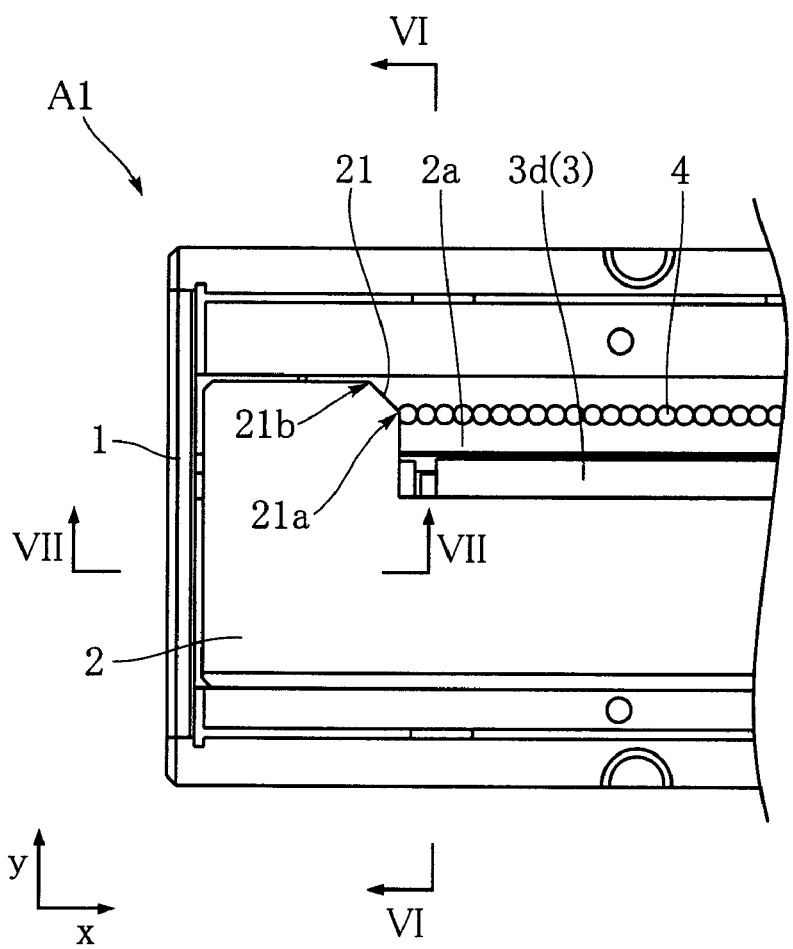
FIG. 2 is a plan view showing a principal portion of the image sensor module of the first embodiment.
Figure 3:
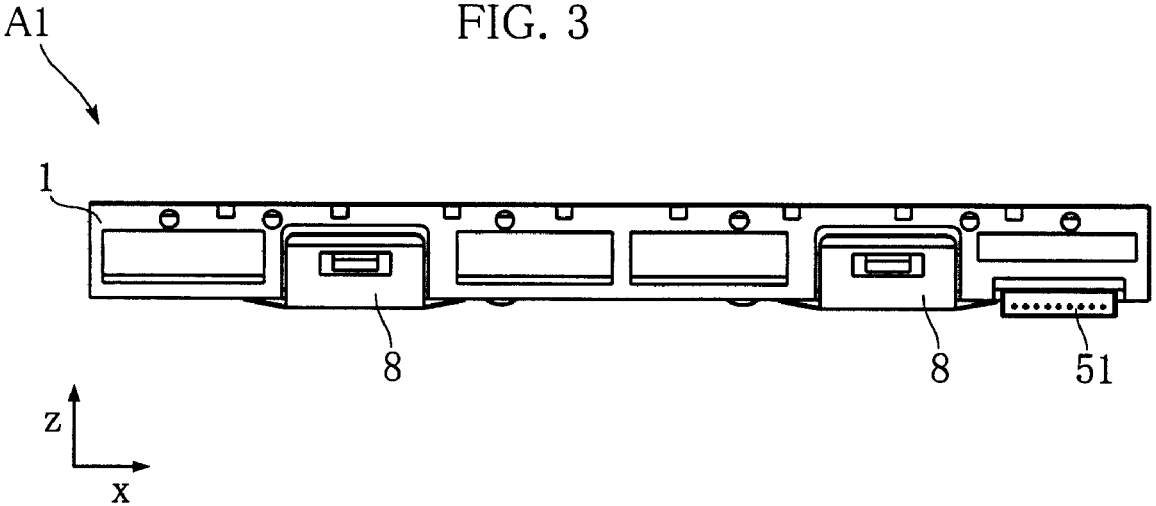
FIG. 3 is a front view showing the image sensor module of the first embodiment.

The reflector 2 is formed with an opening 2a. As shown in FIG. 6, the opening 2a allows the linear light from the light guiding member 3 to pass therethrough toward an object P to be read and allows the linear light reflected by the object P to pass therethrough toward the lens unit 4. As will be understood from FIG. 2 (and FIG. 6), the light emitting surface 3d of the light guiding member 3 and the lens unit 4 are positioned within the opening 2a in the direction y. As shown in FIG. 1, the portions of the reflector 2 which form the ends in the direction x are formed with inclined surfaces 21. Each of the surfaces 21 is inclined with respect to both of the direction x and the direction y and is so inclined as to become more distant from the center in the direction x of the light guiding member 3 as progressing away from the light guiding member 3 in the direction y. Specifically, referring to FIG. 1, the inclined surface 21 on the left side is a standing surface whose normal is perpendicular to the z axis (which is perpendicular to both of the x axis and the y axis), and the normal forms an angle of 45° clockwise with respect to the y axis (see also FIG. 2). Similarly, the inclined surface 21 on the right side is a standing surface whose normal is perpendicular to the z axis, and the normal forms an angle of 45° counterclockwise with respect to the y axis. As shown in FIG. 2, each of the inclined surfaces 21 includes two edges (inner edge 21a and outer edge 21b) extending in the direction z. In the direction y, the inner edge 21a is located at a position overlapping the lenses of the lens unit 4, whereas the outer edge 21b is offset from the lenses in the direction to be away from the light guiding member 3.

Figure 8:
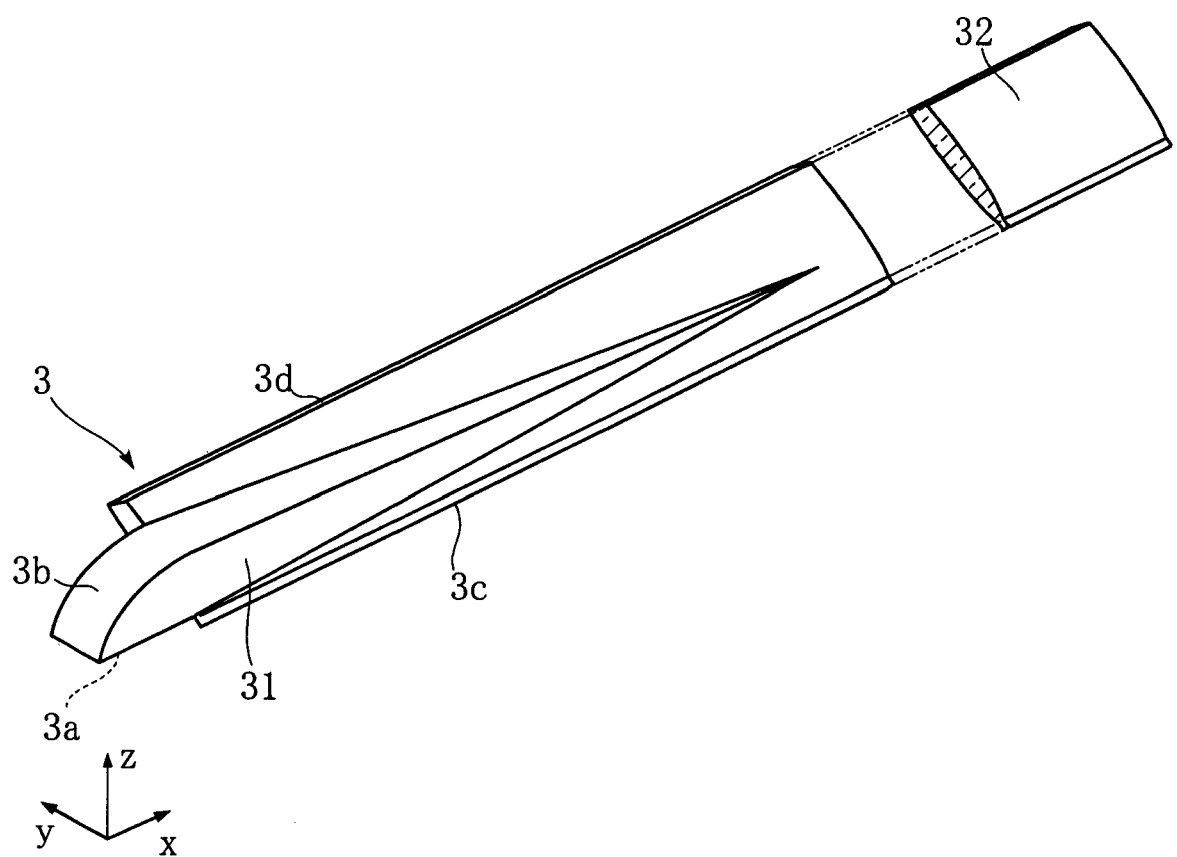
FIG. 8 is a perspective view showing a light guiding member used for the image sensor module of the first embodiment.

The light guiding member 3 is made of a transparent resin such as methyl methacrylate resin (PMMA) and utilized for emitting the light from the LED module 6 as linear light extending in the direction x. As shown in FIG. 8, the light guiding member 3 is made up of a pyramidal portion 31 and a flat portion 32 which are integrally combined with each other and includes a light incident surface 3a, an inclined surface (reflecting curved surface) 3b, a reflecting portion 3c and a light emitting surface 3d. As will be understood from FIG. 6, the pyramidal portion 31 has a center line (not shown) extending in the vertical direction. The center line of the pyramidal portion 31 and that of the flat portion 32 form an angle of about 40°. The pyramidal portion 31 has dimensions of about 3.8 mm in the direction y, about 4.7 mm in the direction z and about 60 mm in the direction x. The flat portion 32 has a thickness of about 1.7 mm and a height of about 8 mm.

As shown in FIGS. 7 and 8, the light incident surface 3a is oriented in the direction z (i.e., the normal to the light incident surface 3a is parallel to the z axis) and faces the LED module 6. The inclined surface 3b reflects the light entering from the light incident surface 3a to cause the light to travel in the direction x. The inclined surface 3b has a shape obtained by stretching out part of the outline of an oval in the direction y. The dimension of the light incident surface 3a in the direction x is about 4 mm, whereas the dimension of the inclined surface 3b in the direction x is about 7.3 mm.

Figure 9:
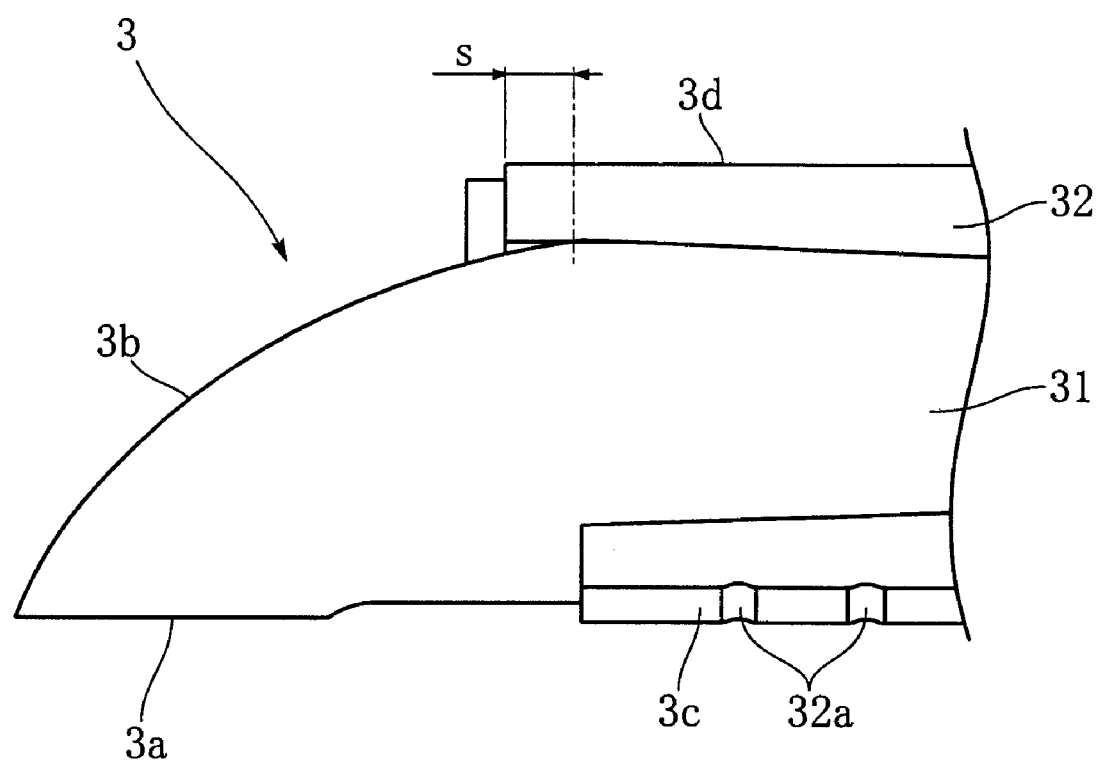
FIG. 9 is a front view showing a principal portion of the light guiding member shown in FIG. 8.

As shown in FIGS. 8 and 9, the reflecting portion 3c extends in the direction x and is provided at the lower end of the flat portion 32. The reflecting portion 3c reflects the light traveling in the light guiding member 3 in the direction x toward the light emitting surface 3d. As shown in FIG. 9, the reflecting portion 3c comprises a plurality of grooves 32a. The grooves 32a are arranged at equal intervals in the direction x. The size of each groove increases with increasing distance from the inclined surface 3b. As shown in FIG. 8, the light emitting surface 3d extends in the direction x and is provided at the upper end of the flat portion 32. The reflecting portion 3c has a width of about 0.6 mm, whereas the light emitting surface 3d has a width of about 1.6 mm.

The reflecting portion 3c and the light emitting surface 3d are substantially equal to each other in length in the direction x but differ from each other in the positional relationship with the inclined surface 3b. As shown in FIG. 9, the right end of the inclined surface 3b in the direction x and the left end of the reflecting portion 3c in the direction x are at the same position in the direction x (i.e., have the same x-coordinate). Thus, in the direction x, the inclined surface 3b and the reflecting portion 3c do not overlap each other. (That is, in FIG. 9, when the segment obtained by the orthogonal projection of the inclined surface 3b onto the x axis is defined as segment 1 and the segment obtained by the orthogonal projection of the reflecting portion 3c onto the x axis is defined as segment 2, the length of the overlapping portion of the segment 1 and segment 2 is 0.) On the other hand, in the direction x, the left end of the light emitting surface 3d is positioned on the left side of the right end of the inclined surface 3b. That is, in the direction x, the inclined surface 3b and the light emitting surface 3d overlap each other by dimension s. The dimension s is about 1 mm.

The lens unit 4 is an optical part for converging the linear light reflected by the object P onto the optical sensor 7. The lens unit 4 comprises a plurality of columnar lenses arranged in the direction x and a housing made of resin for holding the lenses.

Figure 4:
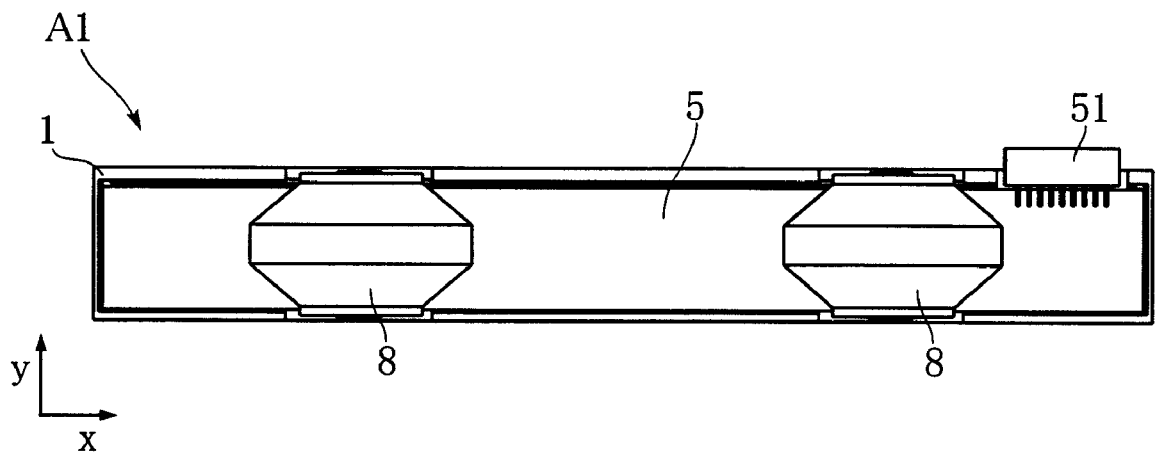
FIG. 4 is a bottom view showing the image sensor module of the first embodiment.
Figure 5:
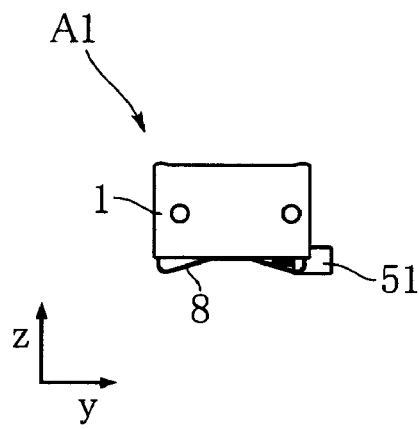
FIG. 5 is a side view showing the image sensor module of the first embodiment.

The substrate 4 is made of e.g. a ceramic material or a glass-fiber-reinforced epoxy resin. The LED module 6 and the optical sensor 7 are mounted on the substrate. As shown in FIGS. 4 and 6, the substrate 5 is fitted in a lower portion of the case 1 and fixed with the metal parts 8. A connector 51 is mounted to the substrate 5. The connector 51 is used for connecting the image sensor module A1 to e.g. a bill reader.

The LED module 6 is the light source of the image sensor module A1 and incorporates e.g. three LED chips for emitting red light, blue light and green light, respectively. The LED module 6 is mounted on the substrate 5 to face the light incident surface 3a.

The optical sensor 7 generates an electromotive force corresponding to the received light and outputs a luminance signal for each pixel from the electromotive force. By receiving the light reflected at the object P by the optical sensor 7, the content of the object P is read as image data.

The advantages of the light guiding member 3 and the image sensor module A1 will be described below.

Referring to FIG. 9, part of the light reflected by the reflecting portion 3c of the light guiding member 3 may travel toward the upper region of the inclined surface 3b. This light is properly emitted from the portion of the light emitting surface 3d which overlaps the inclined surface 3b as part of linear light. This contributes to making the luminance distribution of the linear light uniform in the direction x.

As noted before, the inclined surface 3b and the light emitting surface 3d overlap each other in the direction x. However, in the arrangement in the three dimensional space, the inclined surface 3b and the light emitting surface 3d do not reduce each other's areas. This is because the respective center lines of the pyramidal portion 31 and the flat portion 32 deviate from each other by a predetermined angle (see FIG. 6). Thus, the areas of the inclined surface 3b and the light emitting surface 3d are prevented from reducing, while achieving the uniformity of luminance distribution.

As shown in FIG. 6, the linear light exiting the light guiding member 3 passes through the opening 2a. When the linear light spreads excessively in the direction x, the region of the object P which is not to be read is illuminated with the light. According to the first embodiment, however, the linear light which tends to spread is reflected by the reflector 2 so that the region to be read of the object P is properly illuminated. This is suitable for making the luminance distribution of the linear light which the object P receives uniform in the direction x.

The linear light reflected by the object P also passes through the opening 2a. The inclined surface 21 is provided in the reflector 2 correspondingly to the position through which the reflected linear light passes (see FIGS. 1, 2 and 6). Thus, part of the linear light is reflected by the inclined surface 21. However, the direction of this reflection is substantially deviated from the direction toward the lens unit 4. If a non-inclined surface (the surface whose normal is parallel to the x axis) is provided instead of the inclined surface 21, part of the linear light traveling from the object P is reflected by the non-inclined surface toward the lens unit 4. As a result, a large amount of light unduly enters the portion of the lens unit 4 which is adjacent to the end in the direction x. According to this embodiment, such a problem is avoided, so that proper image data is obtained.

Figure 10:
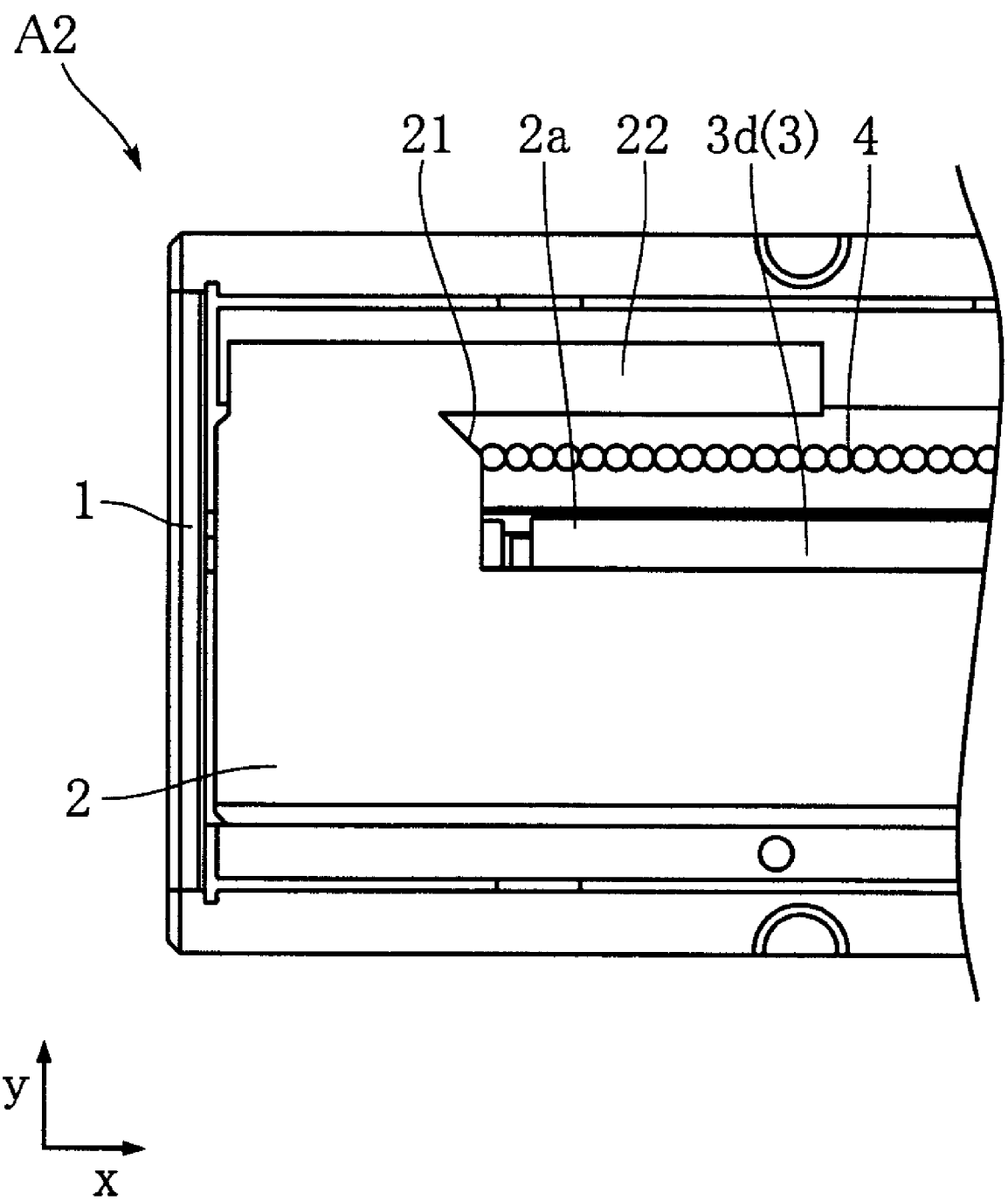
FIG. 10 is a plan view showing a principal portion of an image sensor module according to a second embodiment of the present invention.
Figure 11:
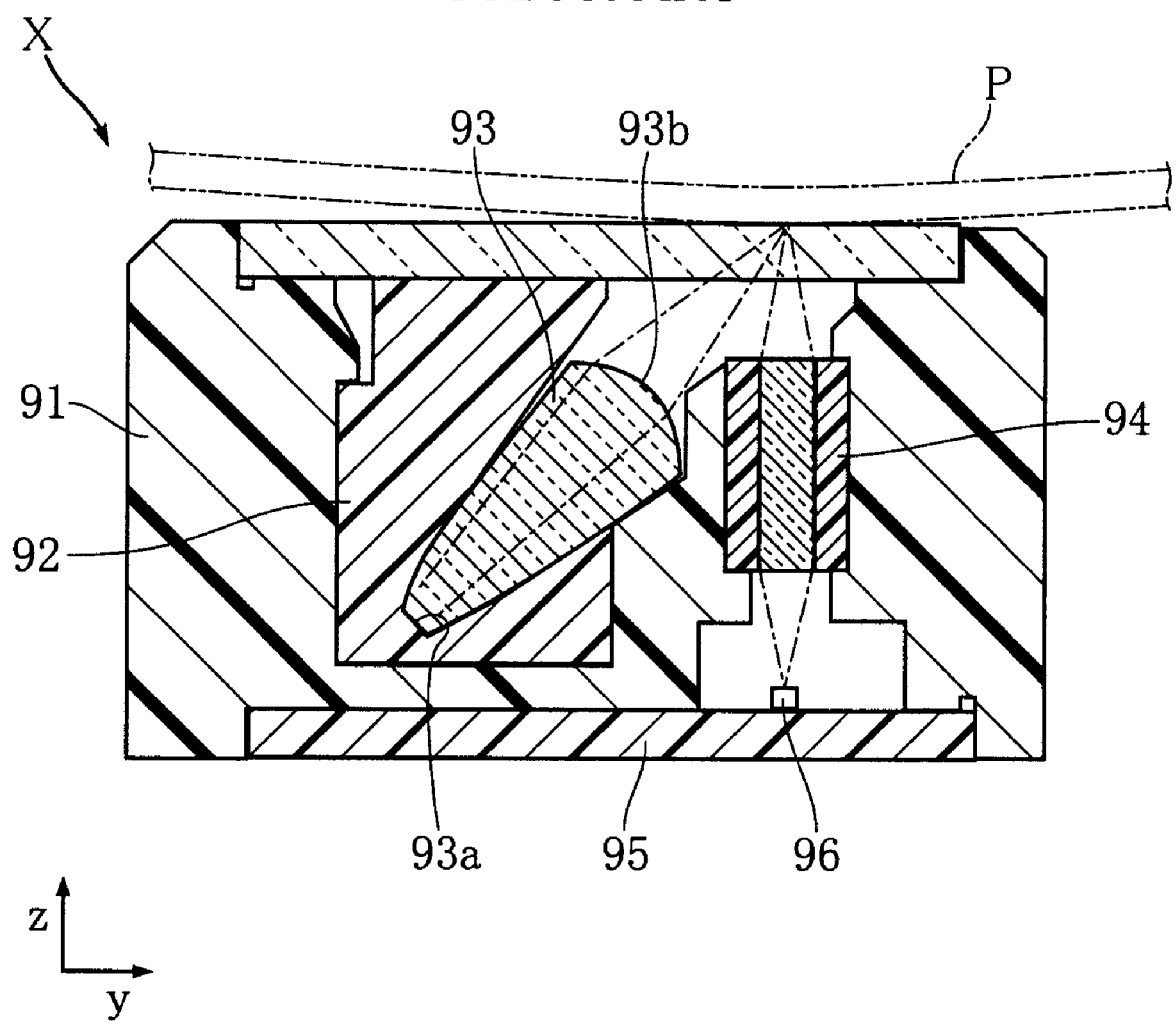
FIG. 11 is a sectional view showing an example of conventional image sensor module.

FIG. 10 shows an image sensor module according to a second embodiment of the present invention. In this figure, the elements which are identical or similar to those of the first embodiment are designated by the same reference signs as those used for the first embodiment.

The image sensor module A2 of the second embodiment differs from the first embodiment in structure of the reflector 2. Specifically, in the second embodiment, the left end of the reflector 2 is formed with an extension 22. The extension 22 is elongated in the direction x from the outer edge (see reference sign 21b in FIG. 2) of the inclined surface 21. The dimension of the extension 22 in the direction z is substantially equal to that of the inclined surface 21. The right end of the reflector 2 may also be formed with a similar extension 22.

With this arrangement, of the linear light exiting the light guiding member 3, the portions spreading in the direction y are reflected by the extension 22 toward the object P. This prevents the luminance distribution of the linear light in the direction x from becoming lower at portions closer to the end.

The light guiding member and the image sensor module according to the present invention are not limited to the foregoing embodiments. For instance, the pyramidal portion 31 and the flat portion 32 (see FIG. 6) may be so arranged that the respective center lines correspond to each other. In this case, part of the flat portion 32 enters the inclined surface 3b.

The invention claimed is:

1. A line image sensor module for reading an image of an object alone a line, comprising:
   a light source;
   a light guiding member elongated in a first direction alone the image reading line and including a light incident surface from which light emitted from the light source enters, a first reflecting surface for reflecting, in the first direction, the light having entered from the light incident surface, a second reflecting surface for reflecting, in a direction crossing the first direction, the light traveling in the first direction, and a light emitting surface separate from the light incident surface for emitting the light from the second reflecting surface as a line of light elongated in the first direction;
   a reflector covering at least part of the light guiding member; and a light receiving element for receiving the line of light reflected by the object in a second direction which is perpendicular to the first direction;

wherein the light incident surface is oriented in the second direction, the first reflecting surface overlaps the light incident surface in the first direction, and the light emitting surface partially overlaps the first reflecting surface in the first direction; and wherein the reflector is formed with an opening and an inclined surface, the opening is elongated in the first direction to allow the line of light reflected by the object to pass therethrough, the inclined surface of the reflector is positioned at an end of the opening in the first direction, and the inclined surface of the reflector has a normal which is neither parallel to the first direction nor parallel to a third direction which is perpendicular to both of the first direction and the second direction.

2. A line image sensor module for reading an image of an object along a line; comprising:

a light source;

a light guiding member elongated in a first direction alone the image reading line and including a light incident surface from which light emitted from the light source enters, a reflecting surface for reflecting, in a direction crossing the first direction, the light traveling from the light incident surface, and a light emitting surface for emitting the light from the reflecting surface as a line of light elongated in the first direction;

a reflector covering at least part of the light guiding member; and a light receiving element for receiving the line of light reflected by the object in a second direction which is perpendicular to the first direction;

wherein the reflector is formed with an opening and an inclined surface, the opening is elongated in the first direction to allow the line of light reflected by the object to pass therethrough, the inclined surface is positioned at an end of the opening in the first direction, and the inclined surface has a normal which is neither parallel to the first direction nor parallel to a third direction which is perpendicular to both of the first direction and the second direction.

3. The image sensor module according to claim 2, further comprising a lens unit for converging the line of light passed through the opening onto the light receiving element, wherein the inclined surface overlaps the lens unit in the third direction.

4. The image sensor module according to claim 2, wherein the reflector is formed with an extension elongated from an edge of the inclined surface in the first direction, the extension being located farther from the light guiding member in the third direction than the inclined surface is.

5. A light guiding member for incorporation in a line image sensor module for reading an image of an object along a line, the light member being elongated in the first direction and comprising:

a light incident surface for allowing entry of light;

a first reflecting surface for reflecting, in the first direction, the light having entered from the light incident surface;

a second reflecting surface for reflecting, in a direction crossing the first direction, the light reflected by the first reflecting surface; and a light emitting surface for emitting the light from the second reflecting surface as a line of light elongated in the first direction;

wherein the light incident surface is oriented in a second direction which is perpendicular to the first direction, the first reflecting surface overlaps the light incident surface in the first direction, and the light emitting surface partially overlaps the first reflecting surface in the first direction.

6. The light guiding member according to claim 5, wherein the second reflecting surface does not overlap the first reflecting surface in the first direction.

7. The light guiding member according to claim 5, wherein the light emitting surface is opposite to the first reflecting surface.

* * * * *